(No Model.)
W. EDDOWES.
PHOTOGRAPHIC VIGNETTER.
No. 572,928. Patented Dec. 8, 1896.
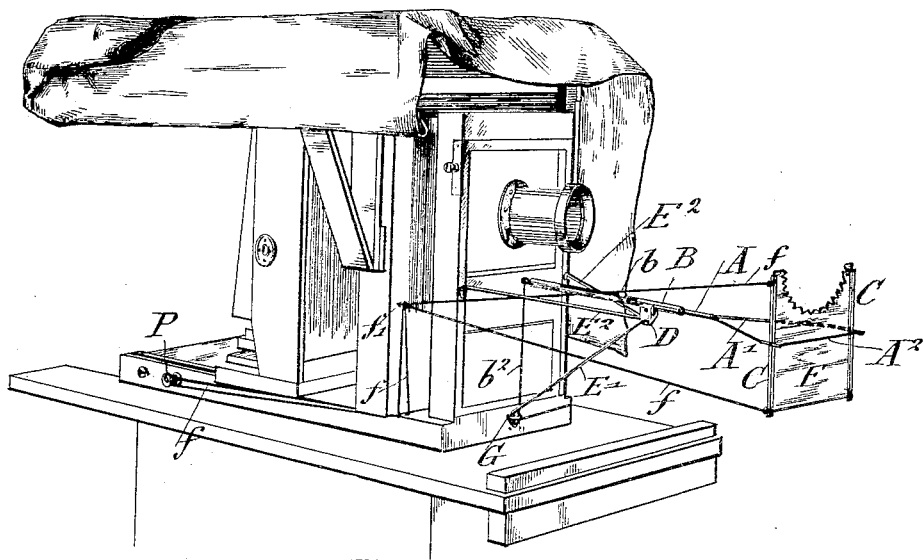
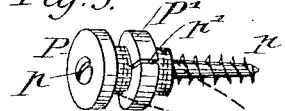
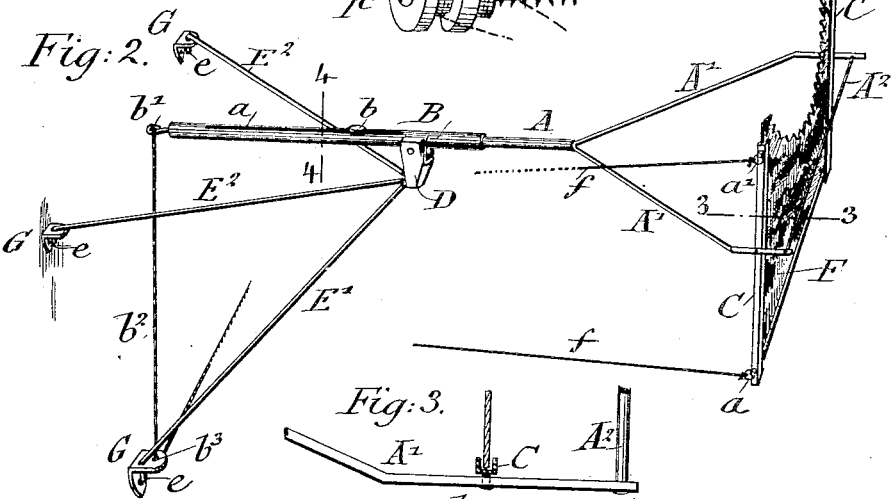
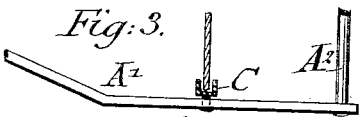
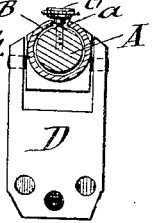
INVENTOR
William Eddowes.
BY
ATTORNEY.

UNITED STATES PATENT OFFICE.

WILLIAM EDDOWES, OF NEWARK, NEW JERSEY.

PHOTOGRAPHIC VIGNETTER.

SPECIFICATION forming part of Letters Patent No. 572,928, dated December 8, 1896.

Application filed August 22, 1896. Serial No. 603,573. (No model.)

*To all whom it may concern:*

Be it known that I, WILLIAM EDDOWES, a citizen of the United States, residing at Newark, in the county of Essex and State of New Jersey, have invented certain new and useful Improvements in Vignetting Attachments for Photographic Cameras, of which the following is a specification.

This invention relates to an improved vignetting attachment for photographic cameras by which the vignette-plate can be adjusted to any desired position, up or down, forward or backward, relatively to the axis of the lens-tube of the camera by the simple manipulation of governing strings or cords arranged alongside the camera and connected with the vignette-holder, by which the operator is enabled to adjust the vignette to the required position while focusing the picture.

The invention consists of a vignetting attachment for photograph-cameras which comprises supporting-arms mounted at the front part of the camera, a block attached to said arms to which the vignette-supporting tube is pivoted, a vignette-holder pivoted to a frame the shank of which is guided in said pivoted tube, and governing-cords applied, respectively, to the upper and lower parts of the vignette-holder and to the inner end of the pivoted tube and guided alongside of the camera, so as to permit, by the pulling of the governing-cords, the ready adjustment of the vignetter relatively to the lens-tube.

In the accompanying drawings, Figure 1 represents a perspective view of a photographic camera with my improved vignetting attachment. Fig. 2 is an enlarged perspective view of the attachment. Fig. 3 is a detail transverse section through the line 3 3, Fig. 2. Fig. 4 is a transverse section on line 4 4, Fig. 2; and Fig. 5 is a perspective view of the turning-knob for the double operating end.

Similar letters of reference indicate corresponding parts.

Referring to the drawings, E' and E² represent three arms that are screwed at their outer ends to a block D and inserted by their bent-over opposite ends $e$ into holes of the three brackets G, that are attached to the front part of the camera, one at each side of and equidistantly from the lens-tube and one vertically below the lens-tube, as shown clearly in Fig. 1. The block D forms, together with the inclined arms extending therefrom, a tripod-like frame for supporting a tube B, which is pivoted in the recessed upper portion of the block D and which serves to support the sliding shank A of the vignette-holding frame, said sliding shank being adjusted in the pivoted tube by means of a set-screw $b$, which passes through a longitudinal slot $a$ therein. From the front end of the sliding shank A extend diverging arms A', arranged in V form and which are connected at their front ends by a cross-rod A², so as to form the supporting-frame to which the vignette-holder C is pivoted, as shown clearly in Figs. 2 and 3. The vignette-holder C is made of channel-brass, or other metal, so as to receive the vignetter F, of cardboard, tin, or other material, which is serrated in the usual manner at its upper curved edge.

The vignette-holder C has rings $a'$ at its upper and lower ends, so as to permit attaching one set of regulating-cords $f\,f$ thereto. The inner end of the pivot-tube B is also provided with a ring or eye $b'$, to which a cord $b^2$ is attached, that passes through an eye $b^3$ in the lower supporting socket or bracket of the tripod and thence around the lower part of the camera-bed to and around a spool that is attached to the hidden side of the camera-bed by a screw or other suitable means, as is evident without illustration.

The cords $f\,f$, which are attached to the vignette-holder C, are guided in a similar manner by means of guide eyes or pulleys $f'$, and are extended backward to the camera-bed to and around a pulley P, finished on a screw $p$, so that on turning the pulley the vignette-holder can be turned in its supporting-frame, so as to be adjusted at an angle, forward or backward, toward the axis of the lens-tube, while the cord $b'$ serves to raise or lower the vignette-holder by the swinging of the pivoted tube B on its pivot in the block D. In one case more or less light is deflected into the lens, as may be desired, while by the upper or lower adjustment of the vignette more or less light is shut off from the lower part of the plate as required by the operator. The pulley P has an annular flange P', provided with a notch $p'$, into which a portion of the double cord $f'$ is caught, so that adjacent portions of the cord can be wound in opposite directions and around the ends of the pulley at opposite sides of flange $P'$, whereby the different side portions of the said cord are either wound upon or unwound from the pulley according to the direction of rotation of the latter.

The advantages of my improved vignette attachment are as follows:

First. It is rigidly attached to the camera, so that it is always directly centered with the lens.

Second. It is attached exclusively to the camera and can thereby be moved with the latter at will on the camera-stand.

Third. It can be adjusted by a forward or backward motion of the vignette-supporting frame, so as to suit lenses of different focal lengths.

Fourth. After the vignetter is once adjusted to the lens it is worked entirely from the back of camera by the cords arranged at opposite sides of the camera-bed.

Fifth. Different lenses can be used with the camera without removing the vignetter.

Having thus described my invention, I claim as new and desire to secure by Letters Patent—

1. A vignetting attachment for photographic cameras, consisting of a supporting frame or tripod attached to the camera; a block at the converging ends of the tripod-arms, an adjustable frame supported pivotally on said block, a vignette-holder pivoted to the outer end of said adjustable frame, and cords connected respectively with the adjustable frame and with the upper and lower ends of the vignette-holder for adjusting the relative position of the vignetter toward the axis of the lens-tube, substantially as set forth.

2. A vignetting attachment for photographic cameras, consisting of arms, forming a tripod, attached to the front part of the camera, a block connecting the converging ends of said arms; a tube pivoted to said block, a frame for the vignette-holder, the shank of which is adapted to slide in said pivoted tube, means for adjusting the shank in said tube, a vignette-holder pivoted to the outer end of the sliding frame, a cord attached to the inner end of the pivoted tube and guided to one side of the camera-bed, a double cord applied to the upper and lower ends respectively of the vignette-holder, and means for guiding said cords along the opposite side of the camera-bed, so as to permit the adjustment of the vignette-holder, either upward and downward, forward and backward, relatively to the lens-tube, substantially as set forth.

In testimony that I claim the foregoing as my invention I have signed my name in presence of two subscribing witnesses.

WILLIAM EDDOWES.

Witnesses:
   GEO. L. WHEELOCK,
   GEO. W. JAEKEL.